United States Patent
Kissack

[19]

[11] Patent Number: 6,050,588
[45] Date of Patent: Apr. 18, 2000

[54] FIFTH WHEEL BALL HITCH LATCHING ASSEMBLY

[76] Inventor: Douglas W. Kissack, P.O. Box 9, Rozet, Wyo. 82727

[21] Appl. No.: 09/106,051

[22] Filed: Jun. 26, 1998

[51] Int. Cl.$^7$ ....................................................... B60D 1/01
[52] U.S. Cl. ............................................ 280/511; 280/434
[58] Field of Search ................................... 280/511, 512, 280/513, 433, 434, 900

[56] References Cited

U.S. PATENT DOCUMENTS

| | | | |
|---|---|---|---|
| 2,634,987 | 4/1953 | Palmer | 280/512 |
| 2,874,976 | 2/1959 | Linn | 280/512 |
| 3,392,992 | 7/1968 | Baker et al. | 280/423 |
| 3,650,546 | 3/1972 | Koenig | 280/423 |
| 3,893,713 | 7/1975 | Ivy | 280/511 |
| 4,008,904 | 2/1977 | Davies | 280/435 |
| 4,176,583 | 12/1979 | Brock | 280/423 |
| 4,221,397 | 9/1980 | Holt | 280/436 |
| 4,320,907 | 3/1982 | Eaton | 280/511 |
| 4,592,566 | 6/1986 | Inoue et al. | 280/433 |
| 4,699,395 | 10/1987 | Hale | 280/511 |
| 4,721,323 | 1/1988 | Czuk et al. | 280/433 |
| 5,183,284 | 2/1993 | Paplinski | 280/508 |
| 5,240,270 | 8/1993 | Colibert | 280/417.1 |
| 5,385,363 | 1/1995 | Morey | 280/511 |
| 5,513,869 | 5/1996 | Putnam | 280/415.1 |

FOREIGN PATENT DOCUMENTS

| | | | |
|---|---|---|---|
| 10326 | 10/1930 | Germany | 280/512 |
| 511173 | 10/1930 | Germany | 280/511 |
| 210461 | 7/1940 | Switzerland | 280/512 |

*Primary Examiner*—Kevin Hurley
*Assistant Examiner*—Michael Cuff

*Attorney, Agent, or Firm*—John K. Flanagan; John R. Flanagan; Flanagan & Flanagan

[57] ABSTRACT

A fifth wheel ball hitch latching assembly includes a housing, a funnel mounted within the housing and defining a conical-shaped passage for guiding movement of a ball hitch into the funnel through an open bottom end thereof toward an open top end thereof as the housing is lowered onto the ball hitch, a shaft mounted in the housing to undergo movement along a longitudinal axis of the housing between raised and lowered positions, the shaft having a lower end extending through the open top end and into the passage of the funnel and biased toward the lowered position, a pair of latch dogs extending through slots in the funnel and being movable away from and toward the longitudinal axis of the housing between retracted and extended positions, a linkage pivotally connecting the shaft with the latch dogs such that movement of the shaft between the lowered and raised positions causes the latch dogs to correspondingly move between the retracted and extended positions such that insertion of the ball hitch through the open bottom end of the funnel brings the ball hitch into contact with the lower end of the shaft causing the shaft to move from the lowered to raised position and thereby cause the latch dogs to move from the retracted to extended position such that the latch dogs capture the ball hitch within the funnel and thereby couple the ball hitch to the trailer tongue, and a locking mechanism mounted on the housing and extending adjacent to the shaft and after movement of the shaft to the raised position being actuatable from an unlocked to locked condition so as to retain the shaft at the raised position and thereby retain the latch dogs at the extended position.

24 Claims, 6 Drawing Sheets

FIFTH WHEEL BALL HITCH LATCHING ASSEMBLY

BACKGROUND OF THE INVENTION

1. Field of the Invention

The present invention generally relates to hitches for towing and, more particularly, is concerned with a fifth wheel ball hitch latching assembly.

2. Description of the Prior Art

Fifth wheel couplings are well-known mechanisms used for towing trailers and the like. Typically, locking jaws mounted on a trailer engage a king pin mounted on a towing vehicle. The jaws are normally locked in a closed position, such as by a spring urging a sliding plunger into a position whereby the jaws cannot rotate or otherwise come apart and release the king pin disposed therebetween. Means are generally provided for withdrawing the plunger from its locking position so as to free the jaws from their closed position.

A variety of fifth wheel coupling mechanisms have been developed over the years. Representative examples of these prior art fifth wheel coupling mechanisms are disclosed in U.S. Pat. No. 4,008,904 to Davies and U.S. Pat. No. 4,592,566 to Inoue et al. A problem exists, however, with the prior art coupling mechanisms in that they do not appear to provide an optimum means for guiding and locking a king pin between locking jaws. Also, many prior art coupling mechanisms are difficult to reach and complicate to operate.

Consequently, a need remains for an assembly which provides a solution to the aforementioned problem in the prior art without introducing any new problems in place thereof.

SUMMARY OF THE INVENTION

The present invention provides a fifth wheel ball hitch latching assembly which is designed to satisfy the aforementioned need. The fifth wheel ball hitch latching assembly of the present invention advantageously includes a funnel which guides a ball hitch between latch dogs disposed in a retracted position, a central shaft which directly contacts the ball hitch to set in motion a linkage that move the latch dogs from the retracted position to an extended position where they capture the ball hitch as the central shaft is axially moved from a lowered position to a raised position, and a cross pin of a latch mechanism that can be rotated to secure the central shaft in the raised position and thereby lock the latch dogs in the extended position. The funnel provides a large target for receiving the ball hitch thereby providing an operator with a greater margin of error in aligning the funnel with the ball hitch. The latch mechanism includes a spring-loaded lock pin on a handle mounted to the cross pin which secures the handle and cross pin in a locked position once the central shaft is in the raised position. The handle is placed so as to be convenient to an operator standing on the ground along the side of the towing vehicle.

Accordingly, the present invention is directed to a fifth wheel ball hitch latching assembly which comprises: (a) a housing mounted to a trailer tongue and defining an interior cavity with an open lower end and a longitudinal axis; (b) a funnel mounted within the housing and having an open top end and an open bottom end disposed adjacent to the open lower end of the housing, the funnel defining a guide passage converging from the open bottom end to the open top end so as to guide movement of a ball hitch of a towing vehicle into the funnel through the open bottom end toward the open top end as the housing on the trailer tongue is lowered onto the ball hitch, the funnel having at least one and preferably a pair of slots defined therethrough between and spaced from the open top and bottom ends; (c) an elongated shaft mounted in the interior cavity of the housing to undergo movement along the longitudinal axis of the housing between raised and lowered positions, the shaft having a lower end extending through the open top end and into the guide passage of the funnel; (d) means biasing the shaft toward the lowered position; (e) at least one and preferably a pair of latch dogs each having opposite upper and lower ends and extending through one of the slots of the funnel and being slidably movable away from and toward the longitudinal axis of the housing between retracted and extended positions; and (f) a linkage pivotally interconnecting the shaft with the latch dogs such that movement of the shaft between the lowered and raised positions causes the latch dogs to correspondingly move between the retracted and extended positions such that insertion of the ball hitch through the open bottom end of the funnel brings the ball hitch into contact with the lower end of the shaft causing the shaft to move from the lowered to raised position and thereby cause the latch dogs to move from the retracted to extended positions such that the lower ends of the latch dogs move under portions of the ball hitch thereby capturing the ball hitch within the funnel and coupling the ball hitch to the trailer tongue.

More particularly, the funnel defines a socket portion of the funnel guide passage between the slots and the open top end of the funnel. The lower end of the shaft projects into the socket upon movement of the shaft to the lowered position by the biasing means. The lower end of the shaft withdraws from the socket upon lifting movement of the shaft to the raised position in response to contact of the ball hitch with the lower end of the shaft as the ball hitch is received in the socket. The slots in the funnel are preferably oriented at opposite oblique angles relative to the longitudinal axis of the housing. Each latch dog has an arcuate configuration in cross section. Each slot of the funnel has an arcuate configuration in cross section that matches the arcuate configuration of the respective latch dog. The biasing means is a coil spring disposed about the shaft above the funnel and captured between a flange fixed on and movable with the shaft and a bracket fixed on the housing and moveably mounting the shaft to undergo movement relative to the housing.

Additionally, the linkage includes a pair of link arms with each of the link arms having a pair of opposite first and second ends. The first end of each link arm is disposed adjacent to the shaft with each link arm extending outwardly to the second end being movable in a direction opposite to the direction of movement of the shaft upon movement of the shaft. The linkage also includes a mounting pin mounted to and extending through the shaft and having opposite ends extending from opposite sides of the shaft. Each link arm is pivotally coupled at the first end to one of the opposite ends of the mounting pin such that each link arm is movable at the first end in the same direction as the shaft. Each latch dog is pivotally mounted at its upper end to the second end of one of the link arms such that movement of the shaft between its lowered and raised positions causes the link arms to move upwardly at the pivotal mounting of the link arms to the shaft and to move downwardly at the pivotal mounting of the link arms to the latch dogs and thereby cause the latch dogs to move from the retracted to extended position relative to funnel guide passage and the ball hitch received therein.

The present invention also is directed to a fifth wheel ball hitch latching assembly which comprises: (a) a housing mounted to a trailer tongue and defining an interior cavity with an open lower end and a longitudinal axis; (b) means mounted within the housing for guiding a ball hitch of a towing vehicle introduced into the housing at the open lower end toward an open top end of the guiding means as the housing on the trailer tongue is lowered onto the ball hitch; (c) a shaft mounted in the interior cavity of the housing to undergo movement along the longitudinal axis of the housing between raised and lowered positions, the shaft having a lower end extending through the open top end of the guiding means; (d) means biasing the shaft toward the lower position; (e) a latching mechanism mounted in the interior cavity of the housing to undergo movement away from and toward the longitudinal axis of the housing between retracted and extended positions in response to movement of the shaft between the lowered and raised positions such that insertion of the ball hitch through the open lower end of the housing brings the ball hitch into contact with the lower end of the shaft causing the shaft to move from the lowered to raised position and thereby cause the latching mechanism to move from the retracted to extended positions so as to capture the ball hitch within the housing and couple the hitch ball to the trailer tongue; and (f) a locking mechanism mounted on the housing and extending adjacent to the shaft, the locking mechanism after movement of the shaft to the raised position being actuatable from an unlocked condition to a locked conditions relative to the shaft so as to retain the shaft at its raised position and thereby retain the latching mechanism at the extended position.

More particularly, the locking mechanism includes a cross pin having a pair of opposite ends and a middle portion disposed between and spaced from the opposite ends. The cross pin extends across the interior cavity of the housing and is mounted at its opposite ends to opposite portions of the housing such that the middle portion of the cross pin extends transversely to and is disposed adjacent to the shaft and the cross pin is rotatable between the locked and unlocked conditions relative to the shaft. The locking mechanism further includes a crank handle disposed outside of the housing and mounted to one of the opposite ends of the cross pin. The crank handle is rotatable with the cross pin between first and second angularly-displaced positions to move the cross pin between the locked and unlocked conditions relative to the shaft. The crank handle has a spring-loaded lock pin for locking the crank handle to the housing when the crank handle is in either of the first and second angularly-displaced positions.

Furthermore, the cross pin has a recessed depression formed on a side of the middle portion thereof. The shaft extends pass the cross pin through the recessed depression of the cross pin and has a recessed pocket formed on a side of the shaft adjacent to the recessed depression of the cross pin such that the shaft receives the cross pin through the recessed pocket of the shaft when the cross pin is rotated to the locked position so as to thereby prevent movement of the central shaft along the longitudinal axis of the housing whereas the recessed depression of the cross pin is aligned with the recessed pocket of the shaft when the cross pin is rotated to the unlocked position so as to thereby allow movement of the shaft along the longitudinal axis of the housing between the lowered and raised positions. The recessed depression of the cross pin is angularly offset from the recessed pocket of the shaft when the cross pin is rotated to the unlocked position, whereas the recessed depression is aligned with the recessed pocket of the shaft when the cross pin is rotated to the locked position.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
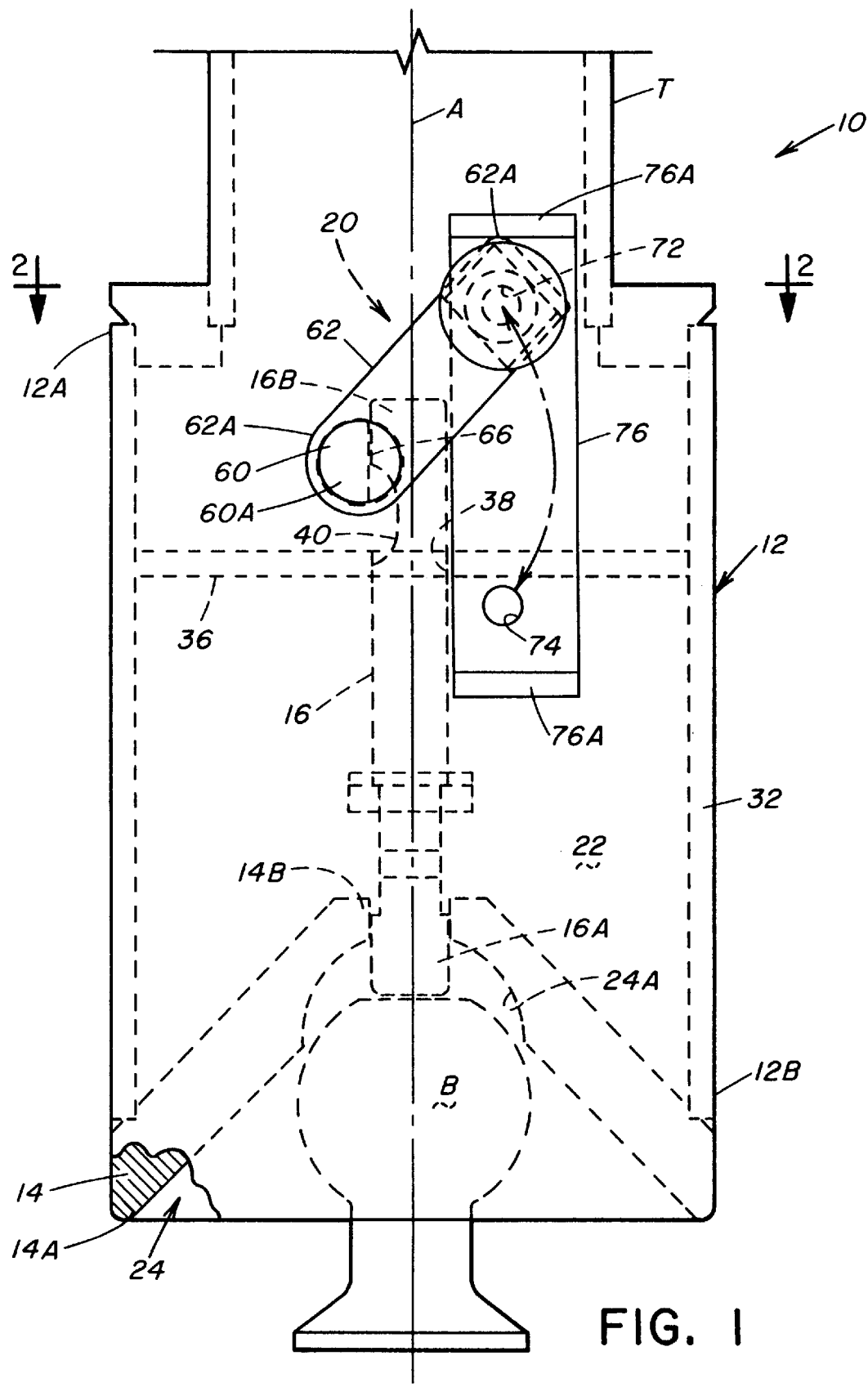
FIG. 1 is a side elevational view of a fifth wheel ball hitch latching assembly of the present invention.

Referring to the drawings and particularly to FIGS. 1 to 4, there is illustrated a fifth wheel ball hitch latching assembly, generally designated 10, of the present invention. Basically, the ball hitch latching assembly 10 includes a housing 12, a funnel 14, an elongated central shaft 16, a latching mechanism 18 and a locking mechanism 20. The housing 12 is mounted at an upper end 12A to a trailer tongue T, defines an interior cavity 22 and has a lower open end 12B and a central longitudinal axis A. The funnel 14 is mounted within the housing 12 adjacent to the open lower end 12B thereof and in a symmetrical relationship about the longitudinal axis A of the housing 12. The funnel 14 is generally conical-shaped and therefore defines a guide passage 24 of the same shape for guiding movement of a ball hitch B attached on a towing vehicle (not shown) into the funnel 14 through an open bottom end 14A thereof and toward an open top end 14B thereof as the housing 12 on the trailer tongue T is lowered onto the ball hitch B. The central shaft 16 is mounted in the interior cavity 22 of the housing 12 to undergo reciprocal movement along the longitudinal axis A of the housing 12 between a raised position seen in FIGS. 1, 3 and 5, and a lowered position seen in FIG. 7. The central shaft 16 has a lower end 16A extending through the open top end 14B and into the guide passage 24 of the funnel 14 and is biased to move to the lowered position by suitable means, such as a coil spring 26, provided about the central shaft 16.

Figure 4:
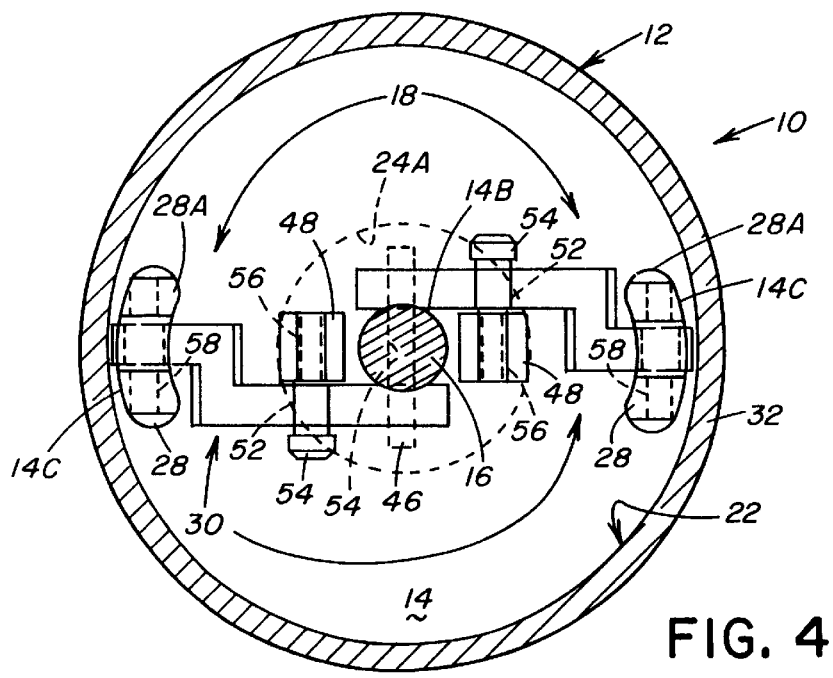
FIG. 4 is a top plan view of the latching assembly as seen along line 4—4 of FIG. 3.

The latching mechanism 18 is mounted in the interior cavity 22 of the housing 12 and includes at least one and preferably a pair of latch dogs 28 and a linkage 30 pivotally interconnecting the latch dogs 28 to the central shaft 16. The latch dogs 28 extend through corresponding slots 14C defined in the funnel 14 between and spaced from the open bottom and top ends 14A, 14B thereof. The slots 14C extend at opposing oblique angles relative to the longitudinal axis A of the housing 12 such that the latch dogs 28 are reciprocally movably guided via the slots 14C away from and toward the longitudinal axis A between a retracted position seen in FIGS. 3 and 5 and an extended position seen in FIG. 7 in response to corresponding reciprocal movement of the central shaft 16 between the aforementioned lowered and raised positions. Each slot 14C has a substantially arcuate cross-sectional configuration, though it may have any other suitable shape, matching a substantially arcuate cross-sectional configuration of each latch dog 28 as can be seen in FIG. 4. Thus, the insertion of the ball hitch B through the open bottom end 14A of the funnel 14 brings the ball hitch B into contact the lower end 16A of the central shaft 16 causing the shaft 16 to be lifted and moved upwardly from the lowered to raised position and thereby via the linkage 30 cause the latch dogs 28 to correspondingly move from the retracted to extended position so as to capture the ball hitch B within the funnel 14 and thereby couple the ball hitch B to the trailer tongue T.

The locking mechanism 20 is mounted on the housing 12 above the funnel 14 and extends adjacent to the central shaft 16. After movement of the central shaft 16 from the lowered position to the raised position, the locking mechanism 20 can be actuated from an unlocked condition seen in FIGS. 1–3 to a locked condition seen in FIG. 7 relative to the central shaft 16 so as to retain the shaft 16 at the raised position and thereby retain the latch dogs 28 of the latching mechanism 18 at their extended position.

More particularly, the housing 12 of the ball hitch latching assembly 10 has a continuous annular side wall 32 defining the central longitudinal axis A. The annular side wall 32 has a substantially cylindrical shape, though may have any other suitable shape. The housing 12 also has a pair of opposite holes 34 defined in first opposite portions of the annular side wall 32 aligned with one another and in a transverse relationship to the central longitudinal axis A. The holes 34 are disposed closer to the upper end 12A than to the open lower end 12B of the housing 12. Each hole 34 has a substantially circular configuration, though may have any other suitable shape. The housing 12 also includes a bracket 36 disposed in the interior cavity 22 of the housing 12 extending across the longitudinal axis A between and attached to second opposite portions of the annular side wall 32 spaced below the opposite aligned holes 32 of the housing 12. Where the bracket 36 crosses the longitudinal axis A the bracket 34 has a hole 38 defined therein of substantially circular configuration, though it may have any other suitable shape. The central shaft 16 extends vertically through the bracket hole 38. The bracket 36 is disposed closer to the upper end 12A than to the open lower end 12B of the housing but is located below the holes 34 of the housing 12 and above the funnel 14. The bracket 36 is substantially flat, though need not be, and has a substantially rectangular configuration, though may have any other suitable shape.

As mentioned above, the conical-shaped funnel 14 of the ball hitch latching assembly 10 defines the similarily-shaped guide passage 24. The diameter of the open bottom end 14A of the funnel 14 is substantially greater than the diameter of the open top end 14B thereof and the latter diameter is greater than the diameter of the central shaft 16 for movably slidably fitting the shaft 16 therethrough. Thus, the guide passage 24 defined by conical-shaped funnel 14 converges from the open bottom end 14A to the open top end 14B thereof so as to guide movement of the ball hitch B of the towing vehicle through the open bottom end 14A toward the open top end 14B as the housing 12 on the trailer tongue T is lowered onto the ball hitch B. In addition to the pair of slots 14C and guide passage 24, the funnel 14 also defines a socket portion 24A of the guide passage 24 which has a semicircular shape and is disposed between the slots 14C and the open top end 14B of the funnel 14. The semicircular cavity 24A receives the lower end 16A of the central shaft 16 therethrough.

The central shaft 16 of the ball hitch latching assembly 10 is mounted through the open top end 14B of the funnel 14 as well as the hole 38 in the bracket 36 and thus is guided in its reciprocable sliding movement along the longitudinal axis A of the housing 12 by the bracket 36 and funnel 14. The central shaft 20 has a substantially cylindrical shape, though it may have any other suitable shape. The central shaft 16 has a recessed pocket 40 defined in a side thereof adjacent to its upper end 16B above the bracket 36, or at any other suitable location. The coil spring 26 is supported about the central shaft 16 by an annular flange 42 mounted to and carried by the central shaft 16 below the bracket 36 and above the funnel 14. The coil spring 26 is captured between bracket 36 which is fixed to and remains stationary with the housing 12 and the flange 42 fixed on and movable with the central shaft 16. With such arrangement, the coil spring 26 biases the central shaft 16 to move to its lowered position.

The linkage 30 of the latching mechanism 18 includes a pair of link arms 44, a mounting pin 46 and a pair of mounting tabs 48. Each link arm 44 has a pair of opposite first and second ends 44A, 44B. The first end 44A of each link arm 44 is disposed adjacent to the central shaft 16 below the flange 42. Each link arm 44 extends outwardly to the second end 44B which is trapped below one of a pair of outer abutments or ledges 50 and, particularly, against an inclined bottom 50A of the one of the outer ledges 50. The second end 44B of each link arm 44 is movable in a direction opposite to the direction of movement of the central shaft 16 upon movement of the central shaft 16. The second end 44B of each link arm 44 is laterally offset from the first end 44A. Each link arm 44 has a hole 52 defined therethrough closer to the first end 44A than to the second end 44B.

The mounting pin 46 of the linkage 30 is mounted to and extends through a transverse bore 54 defined through the central shaft 16 below the flange 42. The mounting pin 46 at its opposite ends extends from opposite sides of the shaft 16 such that the link arms 44 at their first ends 44A are pivotally coupled to the respective opposite ends of the pin 46 and thus are movable in the same direction as the central shaft 16. The mounting pin 46 shown in FIG. 4 has a substantially cylindrical configuration, though it may have any other suitable shape. The outer abutments or ledges 50 are preferably formed integral with and extending interiorly from third opposite portions of the annular side wall 32 of the housing 12 below the bracket 36.

The mounting tabs 48 of the linkage 30 are fixedly mounted at lower ends to the funnel 14 on opposite sides of and adjacent to the open top end 14B of the funnel 14 and, in turn, pivotally support the respective link arms 44 by pins 54 inserted through holes 56 in upper ends of the mounting tabs 48 and through the holes 52 of the link arms 44. Each mounting tab 48 has a substantially rectangular shape in cross-section, though it may have any other suitable shape. The upper end 28A of each latch dog 28 is pivotally coupled by a pin 58 to the second end 44B of a respective one of the link arm 44 and the upward movement of each latch dog 28 is limited by the presence of a respective one of the ledges 50.

Figure 5:
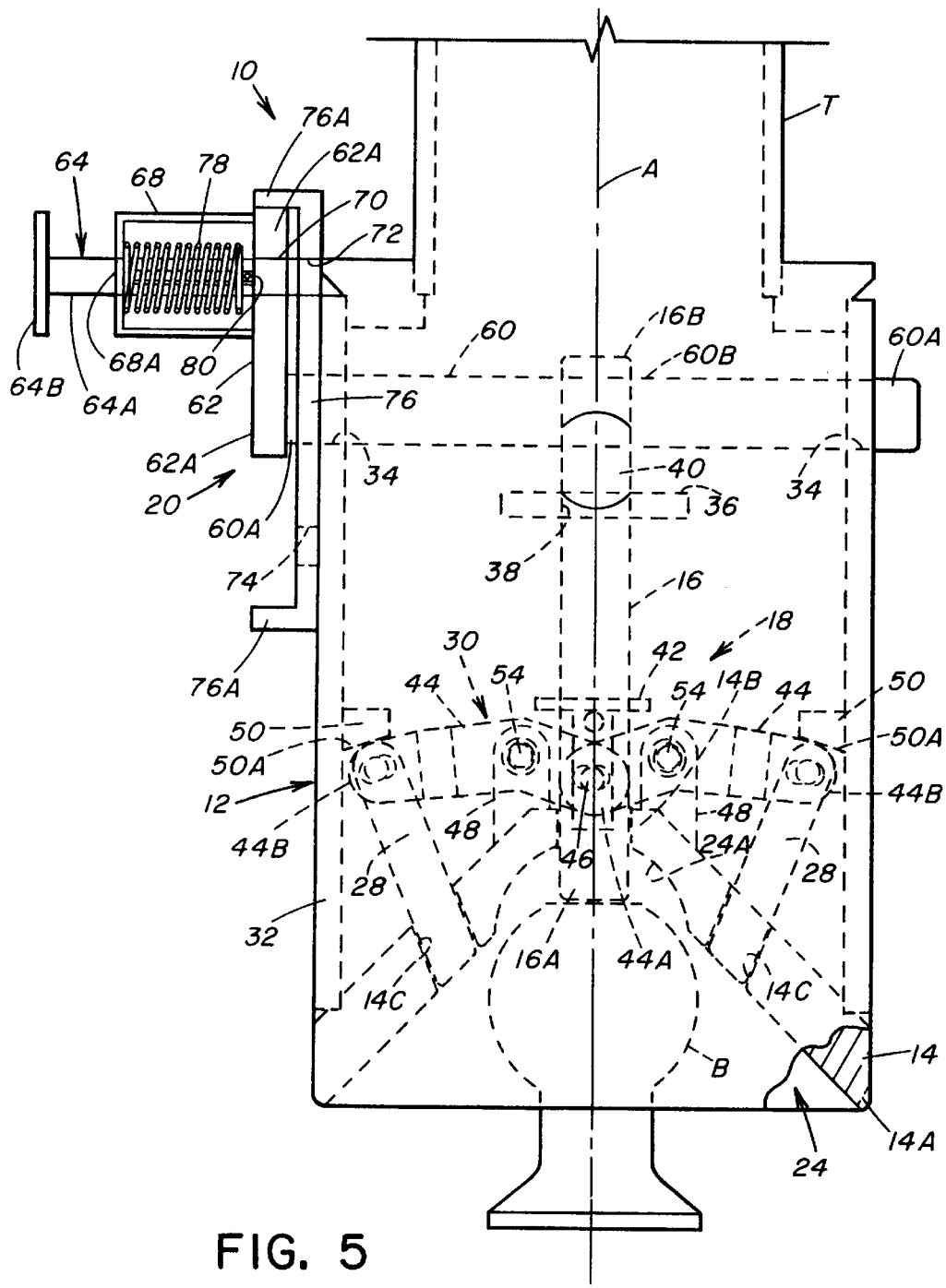
FIGS. 5 to 7 are side elevational views of the latching assembly showing successive stages in coupling of the ball hitch to the latching assembly.
Figure 7:
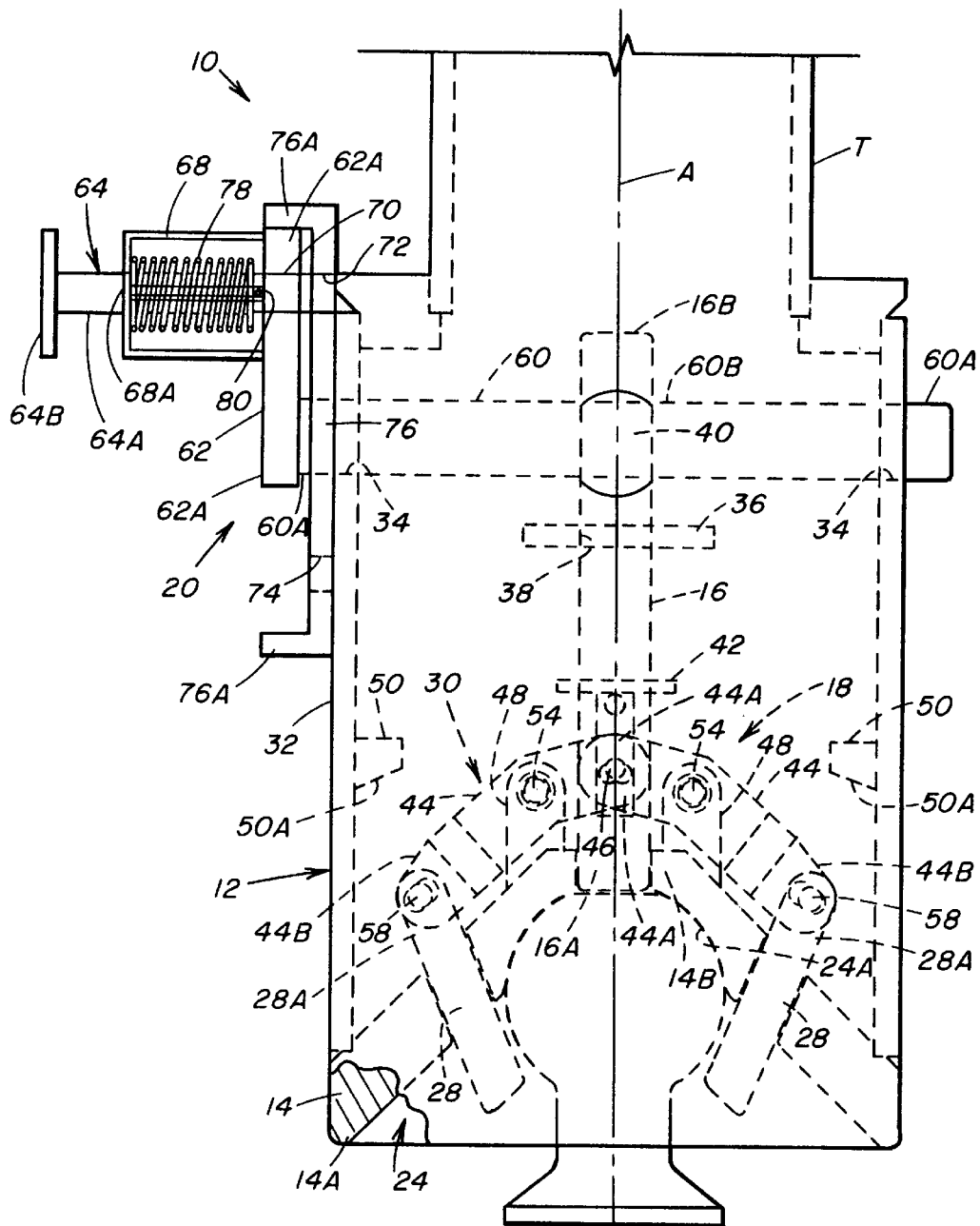

The locking mechanism 20 of the ball hitch latching assembly 10 includes a cross pin 60, a crank handle 62 and a spring-loaded lock pin 64. The cross pin 60 has opposite ends 60A mounted through the holes 34 in the side wall 32 of the housing 12 and extends across the interior cavity 22 of the housing 12 such that a middle portion 60B of the cross pin 60 spaced from the opposite ends 60A thereof extends transversely to and is disposed adjacent to the recessed pocket 40 of the central shaft 16. The cross pin 60 is rotatable relative to the housing 12 between locked and unlocked conditions relative to the central shaft 16 as seen in FIGS. 5 and 7. The cross pin 60 has a substantially cylindrical configuration, though it may have any other suitable shape, for fitting through the substantially circular holes 34 of the housing 12.

Figure 2:
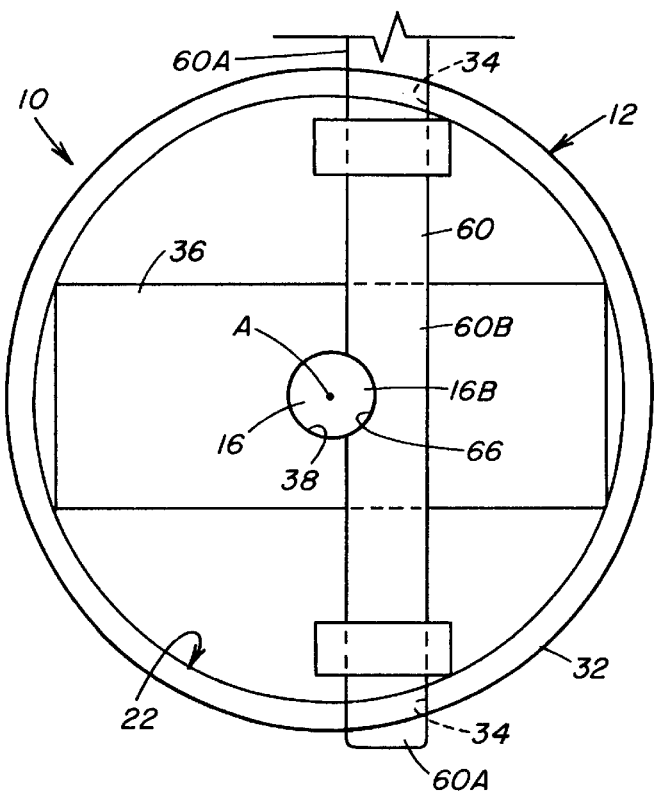
FIG. 2 is a top plan view of the latching assembly as seen along line 2—2 of FIG. 1.

The cross pin 60 also has a recessed depression 66 formed on a side of the middle portion 60B thereof, or at any other suitable location. The recessed depression 66 of the cross pin 60 has a substantially arcuate configuration as shown in FIG. 2 similar to that of the recessed pocket 40 of the central shaft 16. The central shaft 16 extends pass the cross pin 60 through the recessed depression 66 of the cross pin 60. The recessed pocket 40 of the central shaft 16 is disposed adjacent to but displaced along the longitudinal axis A from the recessed depression 66 of the cross pin 60 when the shaft 16 is at the lowered position seen in FIGS. 1, 3 and 5. The recessed pocket 40 of the central shaft 16 is aligned with the recessed depression 66 of the cross pin 60 when the shaft 16 is at the raised position seen in FIG. 7. With the central shaft 16 at the raised position and the cross pin 60 at its unlocked condition, the recessed depression 66 of the cross pin 60 is aligned with the recessed pocket 40 of the central shaft 16 so as to allow movement of the central shaft 16 along the longitudinal axis A between its lowered and raised positions. If the cross pin 60 is rotated relative to the central shaft 16 to the locked condition, the recessed depression 66 of the cross pin 60 becomes angularly offset from the recessed pocket 40 of the central shaft 16 and the middle portion 60B of the cross pin 60 adjacent to the recessed depression 66 becomes disposed in the recessed pocket 40 of the shaft 16 so as to prevent movement of the central shaft 16 along the longitudinal axis A from the raised position to the lowered position.

Figure 3:
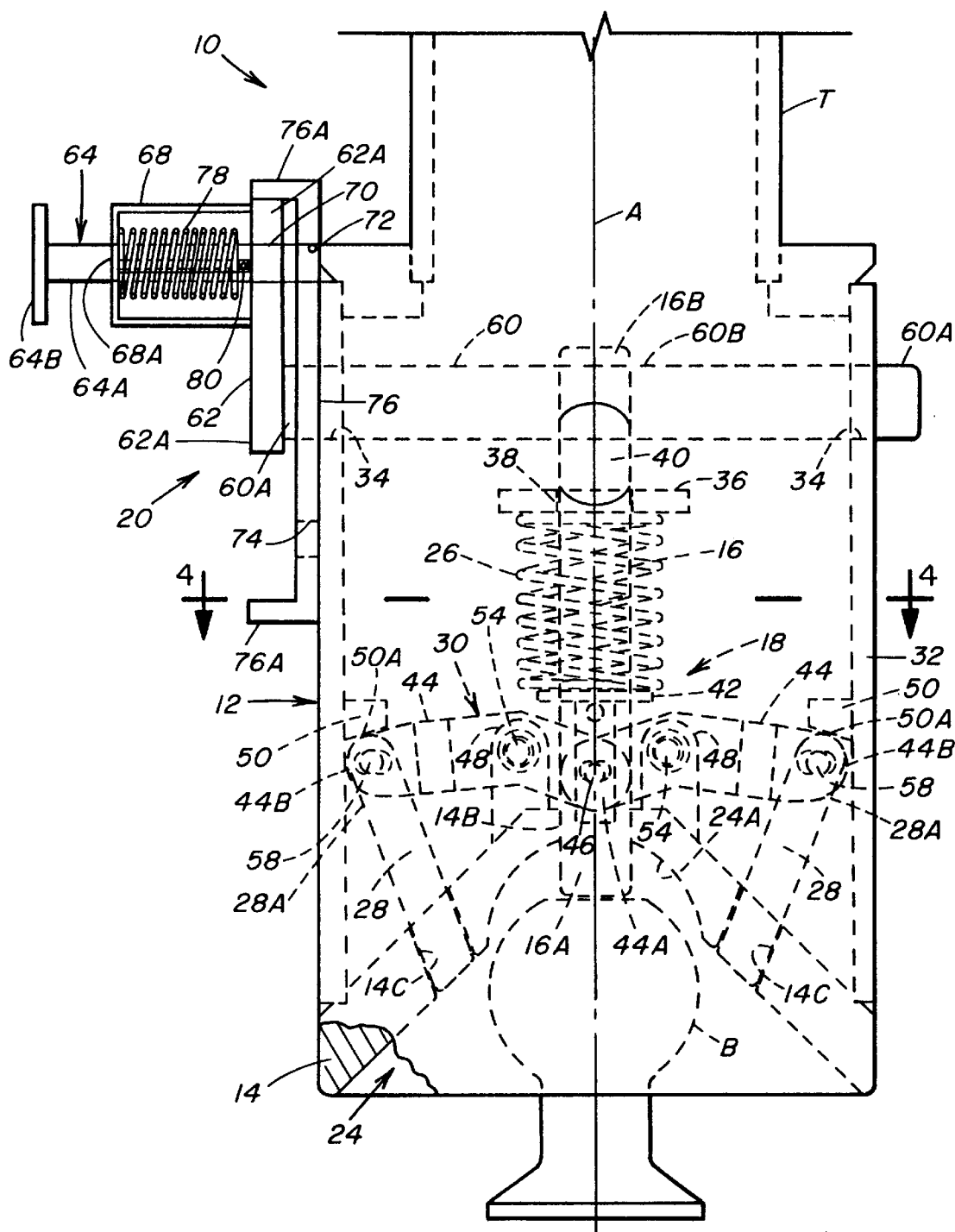
FIG. 3 is another side elevational view of the latching assembly rotated 90 degrees in relation to the side of the latching assembly shown in FIG. 1.

The crank handle 62 is disposed outside the housing 12 and is fixedly mounted at one of its opposite ends 62A to one of the opposite ends 60A of the cross pin 60. The crank handle 62 is thereby rotatable with the cross pin 60 between upper and lower angularly-displaced positions as indicated in FIG. 1 as the cross pin 60 is rotated between its unlocked and locked conditions. The spring-loaded lock pin 64 is mounted to the other of the opposite ends 62A of the crank handle 62 and is operable for locking the crank handle 62 to the housing 12 when the crank handle 62 is in either of its upper or lower positions. As seen in FIG. 3, the lock pin 64 has a shaft portion 64A and a head portion 64B larger in diameter than the shaft portion 64A for gripping by the user. The handle 62 has an U-shaped bracket 68 thereon. The shaft portion 64A of the lock pin 64 is mounted through a hole 68A of the bracket 68 and a hole 70 in the adjacent end of the handle 62 for undergoing reciprocal movement toward and away from one of a pair of holes 72, 74 defined in opposite ends of a stop plate 76 fixed on the side wall 32 of the housing 12. A coil spring 78 is disposed about the shaft portion 64A of the lock pin 64 and is captured between the bracket 68 and a key 80 carried on the end of the shaft portion 64A of the lock pin 64 so as to force the end of the lock pin 64 into engagement with one or the other of the holes 72, 74 in the stop plate 76 when the crank handle 62 is correspondingly in one or the other of its upper and lower positions. The crank handle 62 in its lower position holds the cross pin 60 in its locked condition with the central shaft 16 and thereby prevents release of the ball hitch B from between the latch dogs 28 and from within the socket portion 24A of the funnel guide passage 24, whereas rotation of the crank handle 62 to its upper position rotates the cross pin 60 to its unlocked condition with the central shaft 16 and permits movement of the central shaft 16 from its raised to lowered position and thereby retraction of the latch dogs 28 allowing release of the ball hitch B from the funnel guide passage 24 and disconnection of the ball hitch latching assembly 10 from the ball hitch B. The stop plate 76 has end portions 76A which are upturned and function as stops against which the handle 62 abuts when at the respective upper and lower positions so as to automatically align the lock pin 64 with the locking holes 72, 74 in the stop plate 76.

Figure 6:
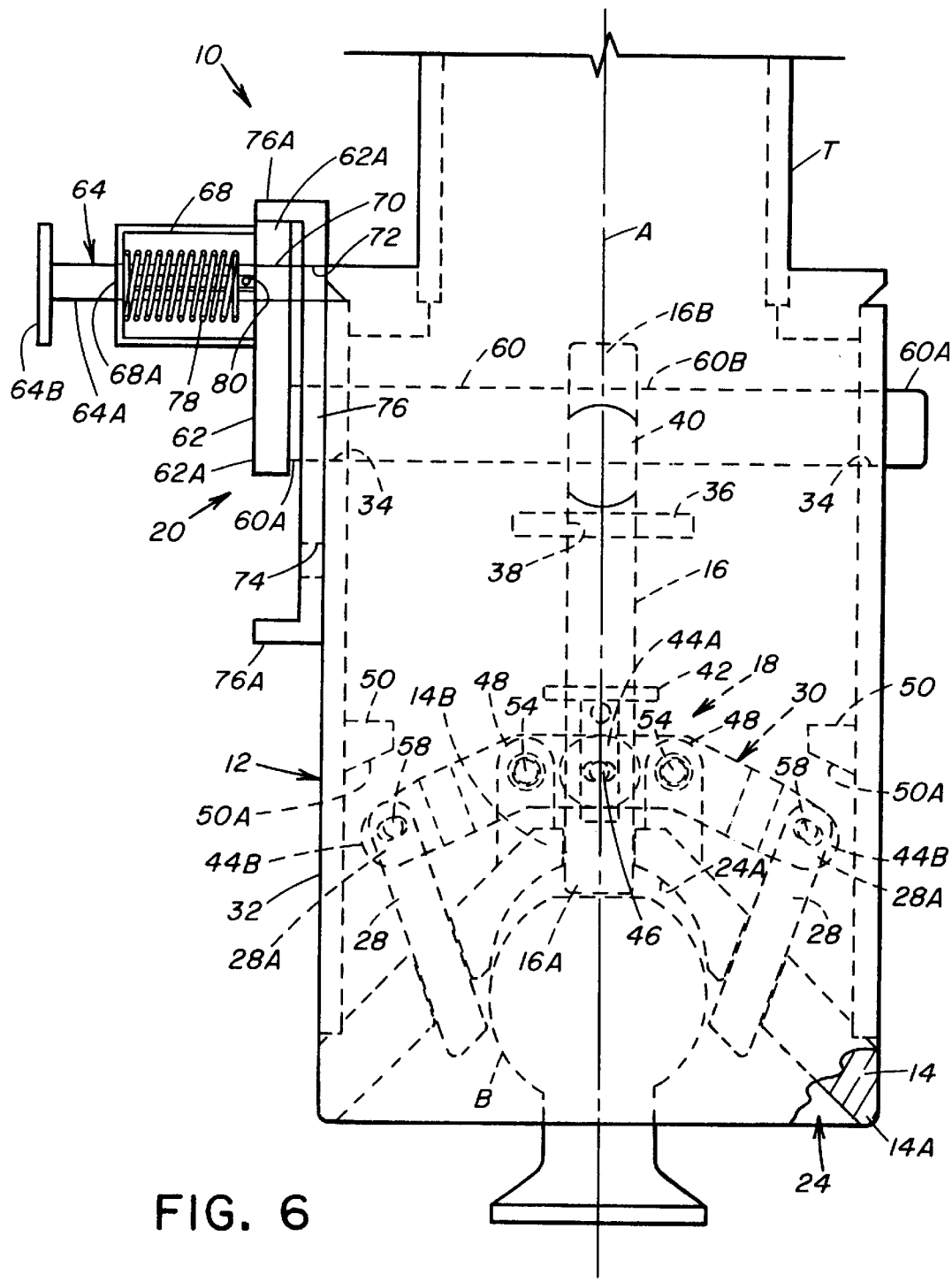

Referring to FIGS. 5 to 7, there is illustrated successive stages in coupling of the ball hitch B with the ball hitch latching assembly 10 of the present invention. FIG. 5 shows the ball hitch B after entering the guide passage 24 of the funnel 14 and making initial contact with the central shaft 16 of the ball hitch latching assembly 10, but before fully seated in the socket portion 24A of the funnel passage 24. FIG. 6 shows the ball hitch B inserted farther into the ball hitch latching assembly 10 such that the central shaft 16 has begun to move upwardly toward its raised position and the latch dogs 28 of the ball hitch latching assembly 10 have begun to extend from the retracted position toward the extended position. FIG. 7 shows the ball hitch B inserted completely into the socket portion 24A of the guide passage 24 of the funnel 14 such that the central shaft 16 has moved even further upwardly and has reached its raised position for locking engagement with the cross pin 60 upon rotation of the crank handle 62 and the latch dogs 28 have extended fully below sides of the ball hitch B to the extended position where they capture the ball hitch.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A fifth wheel ball hitch latching assembly, comprising:
   (a) a housing mounted to a trailer tongue and defining an interior cavity with an open lower end and a longitudinal axis;
   (b) a funnel mounted within said housing and having an open top end and an open bottom end disposed adjacent to said open lower end of said housing, said funnel defining a guide passage converging from said open bottom end to said open top end so as to guide movement of a ball hitch of a towing vehicle into said funnel through said open bottom end toward said open top end as said housing on the trailer tongue is lowered onto the ball hitch, said funnel having at least one slot defined therethrough between and spaced from said open top and bottom ends;
   (c) an elongated shaft mounted in said interior cavity of said housing to undergo movement along said longitudinal axis of said housing between raised and lowered positions, said shaft having a lower end extending through said open top end and into said guide passage of said funnel;
   (d) means biasing said shaft toward said lowered position;
   (e) at least one latch dog having opposite upper and lower ends and extending through said slot of said funnel and being slidably movable away from and toward said longitudinal axis of said housing between retracted and extended positions; and
   (f) a linkage pivotally interconnecting said shaft with said latch dog such that movement of said shaft between said lowered and raised positions causes said latch dog to correspondingly move between said retracted and extended positions such that insertion of the ball hitch through said open bottom end of said funnel brings the ball hitch into contact with said lower end of said shaft causing said shaft to move from said lowered to raised position and thereby cause said latch dog to move from said retracted to extended positions such that said lower end of said latch dog moves under a portion of the ball hitch thereby capturing the ball hitch within said funnel and coupling the ball hitch to the trailer tongue.

2. The assembly of claim 1 wherein said funnel defines a socket portion of said guide passage of said funnel between said slot and said open top end of said funnel, said lower end of said shaft being projected into said socket upon movement of said shaft to said lowered position by said biasing means, said lower end of said shaft being withdrawn from said socket upon movement of said shaft to said raised position in response to contact of the ball hitch with said lower end of said shaft as the ball hitch is received in said socket.

3. The assembly of claim 1 wherein said biasing means is a coil spring disposed about said shaft above said funnel and captured between a flange fixed on and movable with said shaft and a bracket fixed on said housing and moveably mounting said shaft to undergo said movement along said longitudinal axis relative to said housing.

4. The assembly of claim 1 further comprising:
a pair of slots in said funnel being oriented at opposite oblique angles relative to said longitudinal axis of said housing.

5. The assembly of claim 1 further comprising:
a pair of latch dogs corresponding to said pair of slots.

6. The assembly of claim 5 wherein:
each of said latch dogs has an arcuate configuration in cross section; and
each of said slots of said funnel has an arcuate configuration in cross section that matches said arcuate configuration of said respective latch dog.

7. The assembly of claim 5 wherein said linkage includes:
a pair of link arms, each of said link arms having a pair of opposite first and second ends, said first end being disposed adjacent to said shaft, each of said link arms extending outwardly to said second end being movable in a direction opposite to the direction of movement of said shaft upon movement of said shaft; and
a mounting pin mounted to and extending through said shaft and having opposite ends extending from opposite sides of said shaft, each of said link arms being pivotally coupled at said first end to one of said opposite ends of said mounting pin such that each of said link arms is movable at said first end in the same direction as said shaft;
each of said latch dogs being pivotally mounted at said upper end to said second end of one of said link arms such that movement of said shaft between said lowered and raised positions causes said link arms to move upwardly at said pivotal mounting of said link arms to said shaft and to move downwardly at said pivotal mounting of said link arms to said latch dogs and thereby cause said latch dogs to move from said retracted position to said extended position relative to said guide passage of said funnel and the ball hitch received therein.

8. A fifth wheel ball hitch latching assembly, comprising:
(a) a housing mounted to a trailer tongue and defining an interior cavity with an open lower end and a longitudinal axis;
(b) means mounted within said housing for guiding a ball hitch of a towing vehicle introduced into said housing at said open lower end toward an open top end of said guiding means as said housing on the trailer tongue is lowered onto the ball hitch;
(c) an elongated shaft mounted in said interior cavity of said housing to undergo movement along said longitudinal axis of said housing between raised and lowered positions, said shaft having a lower end extending through said open top end of said guiding means;
(d) means biasing said shaft toward said lowered position;
(e) a latching mechanism mounted in said interior cavity of said housing to undergo movement away from and toward said longitudinal axis of said housing between retracted and extended positions in response to movement of said shaft between said lowered and raised positions such that insertion of the ball hitch through said open lower end of said housing brings the ball hitch into contact said lower end of said shaft causing said shaft to move from said lowered to raised position and thereby cause said latching mechanism to move from said retracted to extended position so as to capture the ball hitch within said housing and couple the ball hitch to the trailer tongue; and
(f) a locking mechanism mounted on said housing and extending adjacent to said shaft, said locking mechanism after movement of said shaft to said raised position being actuatable from an unlocked condition to a locked condition relative to said shaft so as to retain said shaft at said raised position and thereby retain said latching mechanism at said extended position.

9. The assembly of claim 8 wherein said locking mechanism includes a cross pin having a pair of opposite ends and a middle portion disposed between and spaced from said opposite ends, said cross pin extending across said interior cavity of said housing above said guiding means and mounted at said opposite ends to opposite portions of said housing such that said middle portion of said cross pin extends transversely to and is disposed adjacent to said shaft and said cross pin is rotatable between said locked and unlocked conditions relative to said shaft.

10. The assembly of claim 9 wherein said locking mechanism further includes a crank handle disposed outside of said housing and mounted to one of said opposite ends of said cross pin, said crank handle being rotatable with said cross pin between first and second angularly-displaced positions to move said cross pin between said locked and unlocked conditions.

11. The assembly of claim 10 wherein said crank handle has a spring-loaded lock pin for locking said crank handle to said housing when said crank handle is in either of said first and second angularly-displaced positions.

12. The assembly of claim 9 wherein:
said cross pin has a recessed depression formed on a side of said middle portion thereof; and
said shaft extends pass said cross pin through said recessed depression of said cross pin and has a recessed pocket formed on a side of said shaft adjacent to said recessed depression of said cross pin such that said shaft receives said cross pin through said recessed pocket of said shaft when said cross pin is rotated to said locked position so as to thereby prevent movement of said shaft along said longitudinal axis of said housing whereas said recessed depression of said cross pin is aligned with said recessed pocket of said shaft when said cross pin is rotated to said unlocked position so as to thereby allow movement of said shaft along said longitudinal axis of said housing between said lowered and raised positions.

13. The assembly of claim 12 wherein said recessed depression of said cross pin is angularly offset from said recessed pocket of said shaft when said cross pin is rotated to said unlocked position, said recessed depression being aligned with said recessed pocket of said shaft when said cross pin is rotated to said locked position.

14. A fifth wheel ball hitch latching assembly, comprising:
(a) a housing mounted to a trailer tongue and defining an interior cavity with an open lower end and a central longitudinal axis;
(b) a funnel mounted within said housing and having an open top end and an open bottom end disposed adjacent to said open lower end of said housing, said funnel defining a guide passage converging from said open bottom end to said open top end so as to guide movement of a ball hitch of a towing vehicle into said funnel through said open bottom end toward said open top end as said housing on the trailer tongue is lowered onto the ball hitch, said funnel having a pair of slots defined therethrough between and spaced from said open top and bottom ends, said slots being oriented at opposite oblique angles relative to said longitudinal axis of said housing;
(c) an elongated central shaft mounted in said interior cavity of said housing to undergo reciprocal movement along said central longitudinal axis of said housing between raised and lowered positions, said central shaft having a lower end extending through said open top end and into said passage of said funnel;
(d) means biasing said central shaft toward said lowered position;
(e) a pair of latch dogs each having opposite upper and lower ends and extending through one of said slots of said funnel and being slidably movable away from and toward said central longitudinal axis of said housing between retracted and extended positions;
(f) a linkage pivotally interconnecting said central shaft with said latch dogs such that movement of said central shaft between said lowered and raised positions causes said latch dogs to correspondingly move between said retracted and extended positions such that insertion of the ball hitch through said open bottom end of said funnel brings the ball hitch into contact with said lower end of said central shaft causing said central shaft to move from said lowered to raised position and thereby causing said latch dogs to move from said retracted to extended position such that said lower ends of said latch dogs move under portions of the ball hitch thereby capturing the ball hitch within said funnel and coupling the ball hitch to the trailer tongue; and
(g) a locking mechanism mounted on said housing and extending adjacent to said central shaft, said locking mechanism after movement of said central shaft to said raised position being actuatable from an unlocked condition to a locked condition relative to said central shaft so as to retain said central shaft at said raised position and thereby retain said latch dogs at said extended position.

15. The assembly of claim 14 wherein said funnel defines a socket portion of said passage of said funnel between said slots and said open top end of said funnel, said lower end of said central shaft being projected into said socket upon movement of said central shaft to said lowered position by said biasing means, said lower end of said central shaft being withdrawn from said socket upon movement of said central shaft to said raised position in response to contact of the ball hitch with said lower end of said central shaft as the ball hitch is received in said socket.

16. The assembly of claim 14 wherein said biasing means is a coil spring disposed about said central shaft above said funnel and captured between a flange fixed on and movable with said central shaft and a bracket fixed on said housing and moveably mounting said central shaft to undergo said reciprocal movement relative to said housing.

17. The assembly of claim 14 wherein said linkage includes:
a pair of link arms, each of said link arms having a pair of opposite first and second ends, said first end being disposed adjacent to said central shaft, each of said link arms extending outwardly to said second end being movable in a direction opposite to the direction of movement of said central shaft upon reciprocal movement of said central shaft; and
a mounting pin mounted to and extending through said central shaft and having opposite ends extending from opposite sides of said central shaft, each of said link arms being pivotally coupled at said first end to one of said opposite ends of said mounting pin such that each of said link arms is movable at said first end in the same direction as said central shaft;
each of said latch dogs being pivotally mounted at said upper end to said second end of one of said link arms such that movement of said central shaft between said lowered and raised positions causes said link arms to move upwardly at said pivotal mounting of said link arms to said central shaft and to move downwardly at said pivotal mounting of said link arms to said latch dogs and thereby cause said latch dogs to move from said retracted position to said extended position relative to said guide passage of said funnel and the ball hitch received therein.

18. The assembly of claim 14 wherein said locking mechanism includes a cross pin having a pair of opposite ends and a middle portion disposed between and spaced from said opposite ends, said cross pin extending across said interior cavity of said housing and mounted at said opposite ends to opposite portions of said housing such that said middle portion of said cross pin extends transversely to and is disposed adjacent to said central shaft and said cross pin is rotatable between said locked and unlocked conditions relative to said central shaft.

19. The assembly of claim 18 wherein said locking mechanism further includes a crank handle disposed outside of said housing and mounted to one of said opposite ends of said cross pin, said crank handle being rotatable with said cross pin between first and second angularly-displaced positions to move said cross pin between said locked and unlocked conditions.

20. The assembly of claim 19 wherein said crank handle has a spring-loaded lock pin for locking said crank handle to said housing when said crank handle is in either of said first and second angularly-displaced positions.

21. The assembly of claim 18 wherein:
said cross pin has a recessed depression formed on a side of said middle portion thereof; and
said central shaft extends pass said cross pin through said recessed depression of said cross pin and has a recessed pocket formed on a side of said central shaft adjacent to said recessed depression of said cross pin such that said central shaft receives said cross pin through said recessed pocket of said central shaft when said cross pin is rotated to said locked position so as to thereby prevent movement of said central shaft along said central longitudinal axis of said housing whereas said recessed depression of said cross pin is aligned with said recessed pocket of said central shaft when said cross pin is rotated to said unlocked position so as to thereby allow movement of said central shaft along said central longitudinal axis of said housing between said lowered and raised positions.

22. The assembly of claim 21 wherein said recessed depression of said cross pin is angularly offset from said recessed pocket of said central shaft when said cross pin is rotated to said unlocked position, said recessed depression being aligned with said recessed pocket of said central shaft when said cross pin is rotated to said locked position.

23. The assembly of claim 14 wherein each said latch dog has an arcuate configuration in cross section.

24. The assembly of claim 23 wherein each of said slot of said funnel has an arcuate configuration in cross section that matches said arcuate configuration of said respective latch dog.

* * * * *